US012176664B2

(12) United States Patent
Hsiao et al.

(10) Patent No.: US 12,176,664 B2
(45) Date of Patent: Dec. 24, 2024

(54) POWER CONNECTOR MODULE

(71) Applicant: Delta Electronics, Inc., Taoyuan (TW)

(72) Inventors: Wei-Kai Hsiao, Taoyuan (TW); Meng-Hsien Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 360 days.

(21) Appl. No.: 17/850,439

(22) Filed: Jun. 27, 2022

(65) Prior Publication Data

US 2023/0291159 A1 Sep. 14, 2023

(30) Foreign Application Priority Data

Mar. 10, 2022 (CN) ........................ 202210233254.2

(51) Int. Cl.
*H01R 13/60* (2006.01)
*H01R 13/506* (2006.01)
*H01R 27/02* (2006.01)

(52) U.S. Cl.
CPC ........... *H01R 27/02* (2013.01); *H01R 13/506* (2013.01)

(58) Field of Classification Search
CPC .............................. H01R 27/02; H01R 13/506
USPC ............. 439/106, 107, 535, 538, 539, 540.1
See application file for complete search history.

(56) References Cited

U.S. PATENT DOCUMENTS

| | | | | | |
|---|---|---|---|---|---|
| 5,281,154 | A * | 1/1994 | Comerci | H01R 13/6675 | 336/107 |
| 6,362,987 | B1 * | 3/2002 | Yurek | H01R 29/00 | 363/146 |
| 9,368,982 | B2 * | 6/2016 | Jansen | H01R 13/6666 | |
| 10,389,059 | B1 * | 8/2019 | Li | H01R 31/065 | |
| 11,322,867 | B1 * | 5/2022 | Davidsz | H01R 13/516 | |
| 2017/0018896 | A1 * | 1/2017 | Mortun | H01R 4/30 | |
| 2019/0123495 | A1 * | 4/2019 | Darr | H01R 27/02 | |
| 2021/0376587 | A1 * | 12/2021 | Martin | H02G 3/185 | |

* cited by examiner

*Primary Examiner* — Phuong K Dinh
(74) *Attorney, Agent, or Firm* — MUNCY, GEISSLER, OLDS & LOWE, P.C.

(57) ABSTRACT

A power connector module is provided, including a housing, an electrical connector unit disposed in a first space of the housing, and a socket unit disposed in a second space of the housing. The glue is received in the first space, and a gate plate is disposed on a diaphragm of the housing to prevent the glue from flowing into the second space.

10 Claims, 14 Drawing Sheets

POWER CONNECTOR MODULE

CROSS REFERENCE TO RELATED APPLICATIONS

This Application claims priority of China Patent Application No. 202210233254.2, filed on Mar. 10, 2022, the entirety of which is incorporated by reference herein.

BACKGROUND OF THE INVENTION

Field of the Invention

The application relates in general to a power connector module, and in particular to a power connector module that includes a gate plate.

Description of the Related Art

Traditional AC power wall sockets commonly seen in homes and offices do not usually include a USB port. Users often use a USB-to-AC adaptor for electrically connecting a mobile device to the AC power socket, and this can be inconvenient for users.

Therefore, how to provide a power connector module that can be mounted on the wall and easy to use has become an important issue.

BRIEF SUMMARY OF INVENTION

To address the deficiencies of conventional products, an embodiment of the invention provides a power connector module that includes a housing, an electrical connector unit, a socket unit, a glue, a gate plate, and a conductive wire. The housing has a hollow main body and a diaphragm disposed in the main body, wherein the diaphragm has an opening and divides the main body into a first space and a second space. The electrical connector unit is disposed in the first space of the housing. The socket unit is disposed in the second space of the housing. The glue is disposed in the first space and contacts the electrical connector unit. The gate plate is disposed in the opening of the diaphragm to prevent the glue in the first space from flowing into the second space. The conductive wire extends through the gate plate and electrically connecting the socket unit to the electrical connector unit.

In some embodiments, the power connector module further includes a cover joined to the housing.

In some embodiments, the cover has a slot, and the housing further has a protrusion formed on the outer surface of the main body and joined to the slot.

In some embodiments, a gap is formed between the cover and the housing, and some of the glue is received in the gap.

In some embodiments, the electrical connector unit has a circuit module and a connector disposed on the circuit module, and the glue contacts the circuit module.

In some embodiments, the connector is a USB connector.

In some embodiments, the socket unit is an AC power socket.

In some embodiments, the glue is thermal glue.

In some embodiments, the gate plate has a hole, and the conductive wire extends through the hole to electrically connect to the socket unit and the electrical connector unit.

In some embodiments, the electrical connector unit has a circuit module and a plurality of connectors disposed on the circuit module, and the socket unit and the connectors are arranged along the long axis of the power connector module.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the power connector module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
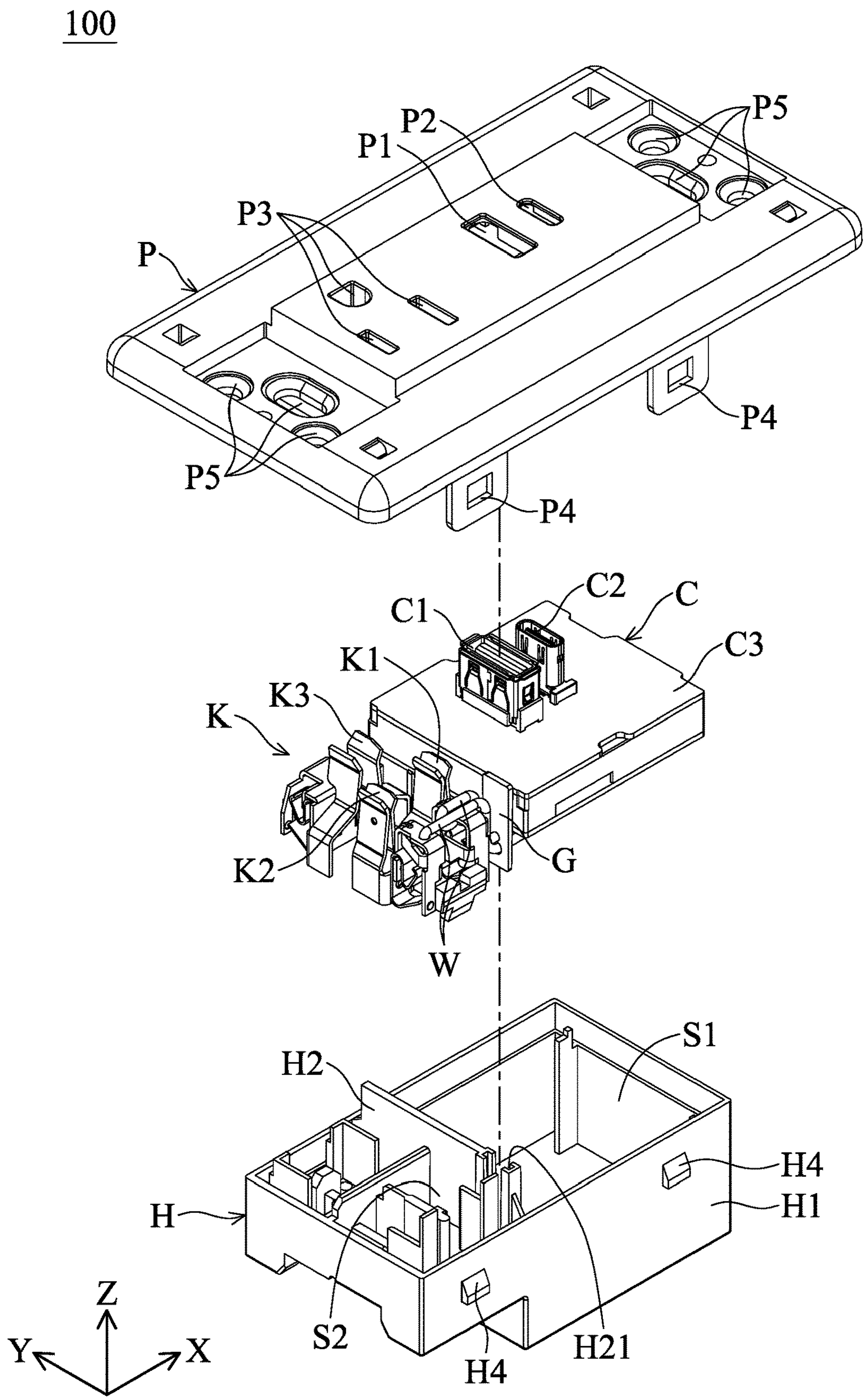
FIG. 1 is an exploded diagram of a power connector module 100, in accordance with an embodiment of the invention.
Figure 2:
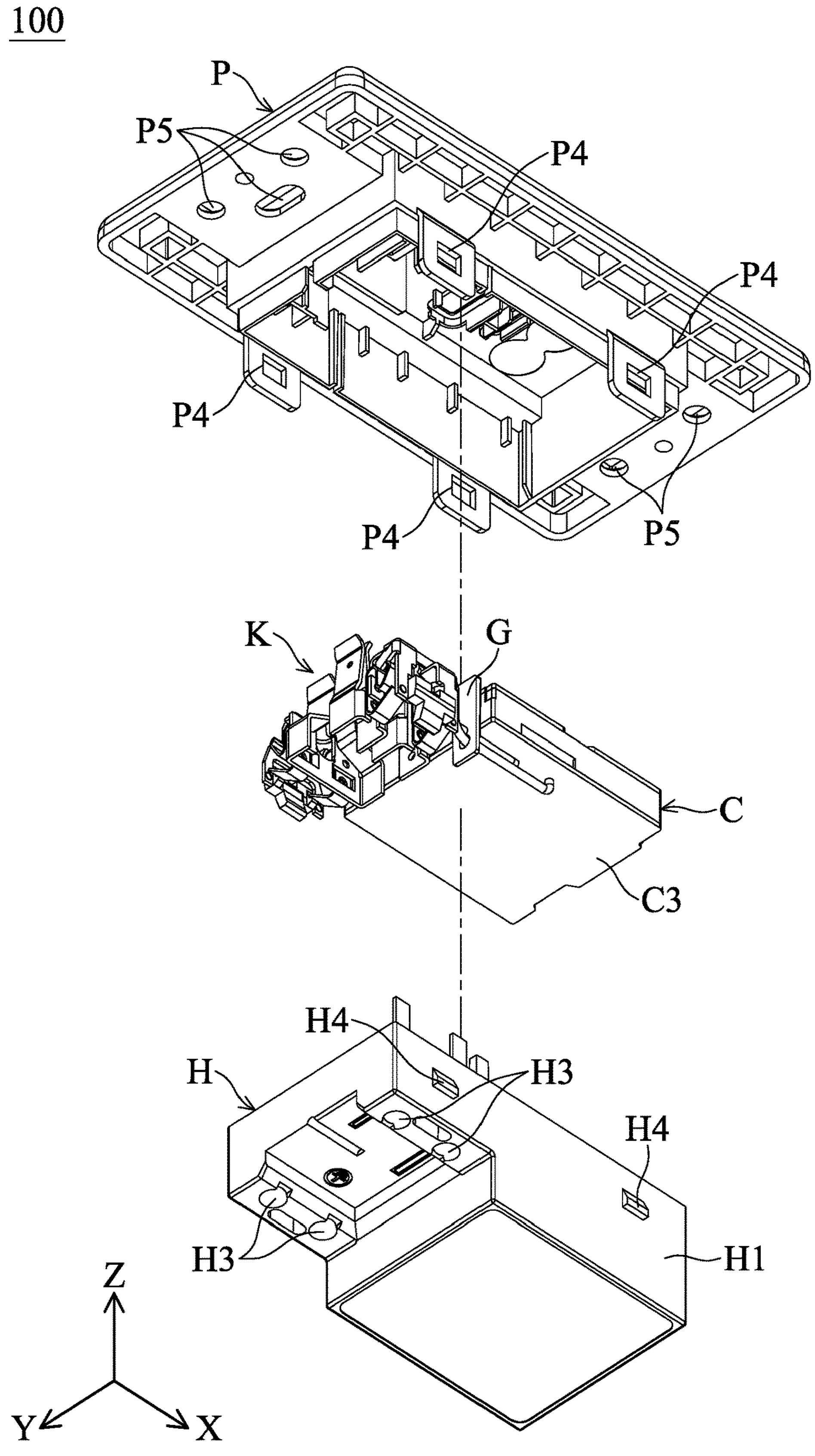
FIG. 2 is another exploded diagram of the power connector module 100 in FIG. 1.
Figure 3:
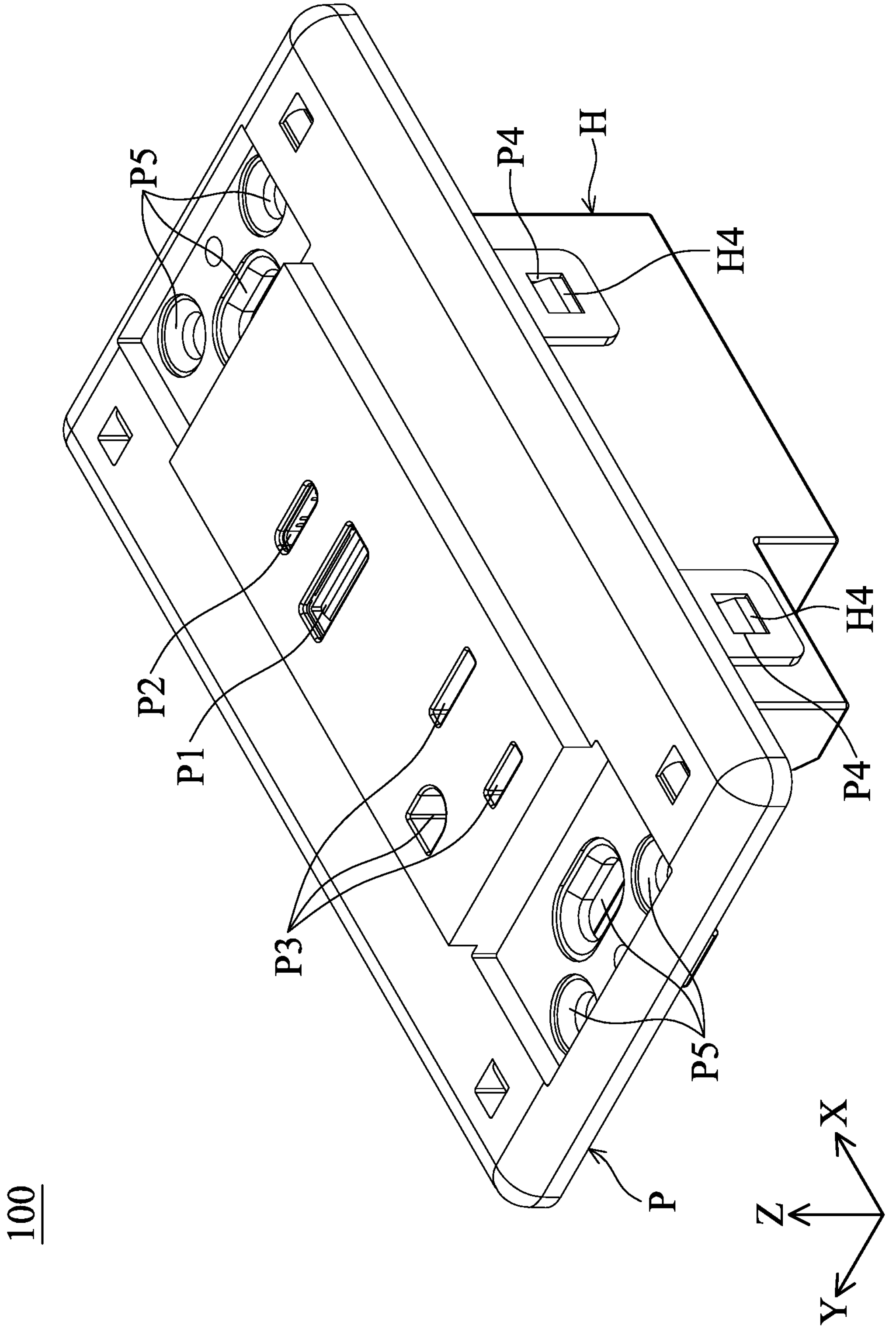
FIG. 3 is a perspective diagram of the power connector module 100 in FIGS. 1 and 2 after assembly.
Figure 4:
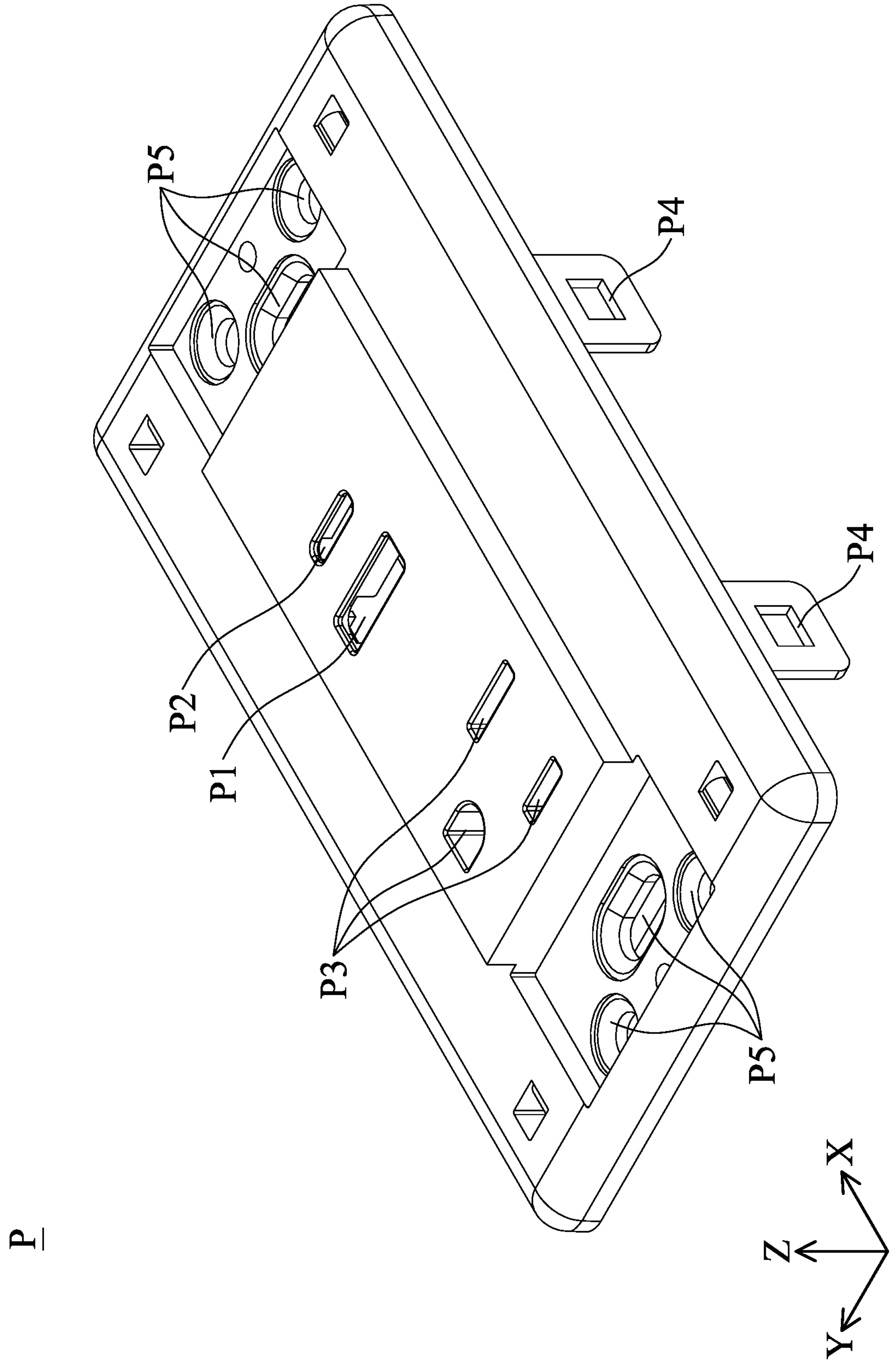
FIG. 4 is a perspective diagram of the cover P.
Figure 5:
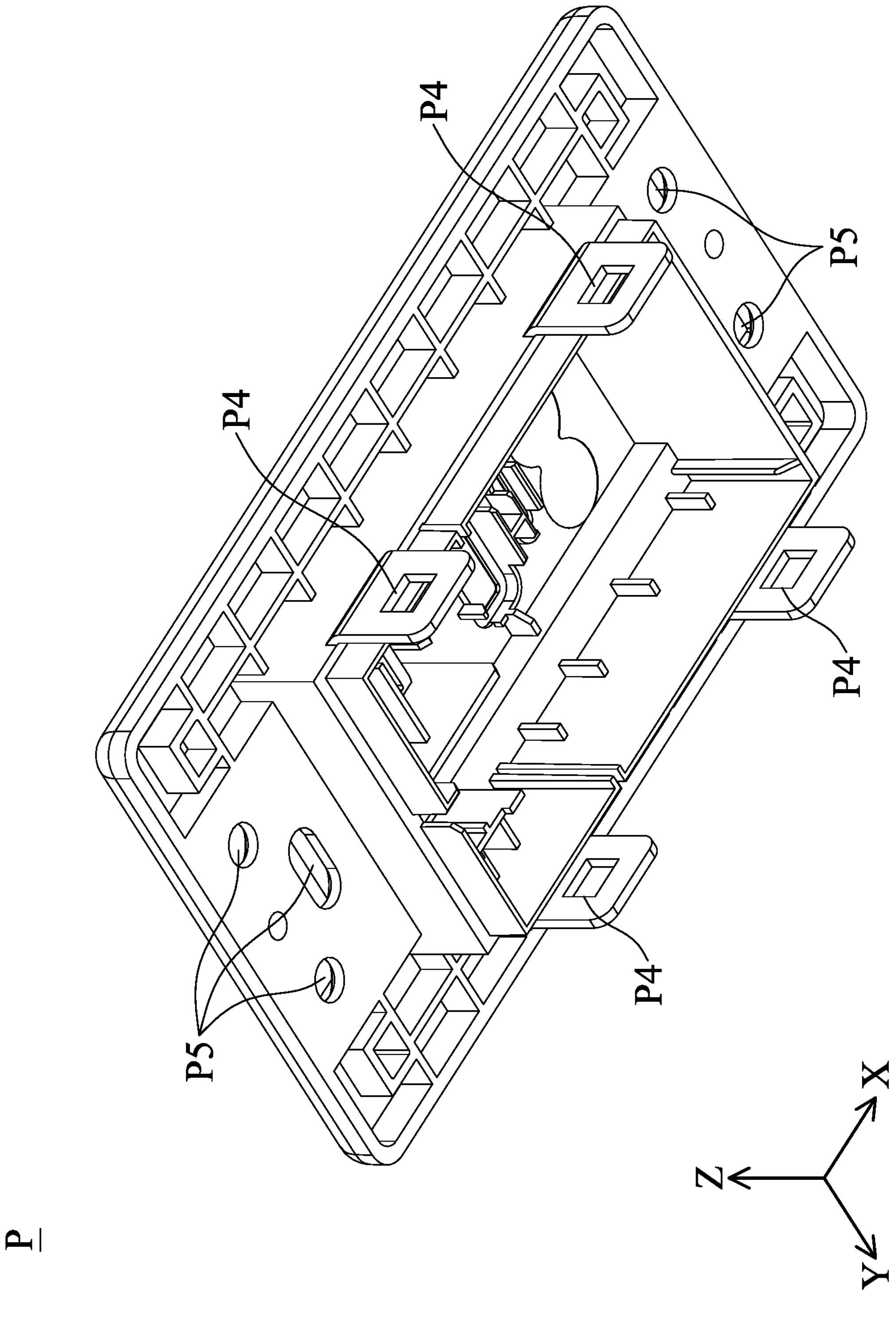
FIG. 5 is another perspective diagram of the cover P.

FIG. 1 is an exploded diagram of a power connector module 100, in accordance with an embodiment of the invention. FIG. 2 is another exploded diagram of the power connector module 100 in FIG. 1. FIG. 3 is a perspective diagram of the power connector module 100 in FIGS. 1 and 2 after assembly. FIG. 4 is a perspective diagram of the cover P. FIG. 5 is another perspective diagram of the cover P.

As shown in FIGS. 1 to 5, an embodiment of a power connector module 100 primarily comprises a cover P, a hollow housing H, a socket unit K, an electrical connector unit C, at least a conductive wire W, and a gate plate G. The cover P and the housing H are detachably connected to each other. The socket unit K, the electrical connector unit C, the conductive wire W, and the gate plate G are disposed in the housing H. The socket unit K and the electrical connector unit C can be electrically connected to each other through the conductive wire W.

The socket unit K may comprise an AC power socket that includes a plurality of conductive portions K1, K2, and K3 for receiving a plug. The electrical connector unit C comprises two connectors C1 and C2 (e.g. USB connectors) disposed on a circuit module C3 for electrical connection to a mobile device (e.g. cell phone or tablet computer), whereby the mobile device can be charged via the connectors C1 and C2.

In this embodiment, the socket unit K and the connectors C1 and C2 are arranged in a direction parallel to the long axis of the power connector module 100.

It should be noted that at least a hole H3 (FIG. 2) is formed at the bottom of the housing H. When the socket unit K and the electrical connector unit C are assembled to the housing H, a cable (not shown) can be inserted through the hole H3 and electrically connected to the socket unit K in the housing H. Hence, the socket unit K and the electrical connector unit C can be electrically connected to a domestic power system through the cable.

Still referring to FIGS. 1 to 5, the cover P forms a plurality of openings P1, P2, and P3, wherein the openings P1 and P2 are located corresponding to the connectors C1 and C2, and the openings P3 are located corresponding to the conductive portions K1, K2, and K3 of the socket unit K. When the power connector module 100 is in use, a plug can be inserted through the openings P3 into the socket unit K. Additionally, a USB connector may also be inserted through the openings P1 or P2 and electrically connected to the connector C1 or C2.

In this embodiment, the cover P further forms a plurality of slots P4 and holes P5. During assembly, several protrusions H4 of the housing H are joined in the slots P4 so that the cover P can be firmly affixed to the housing H. The holes P5 may be threaded holes, and several screws can be inserted through the holes P5 into the wall, whereby the power connector module 100 is mounted on the wall.

Figure 6:
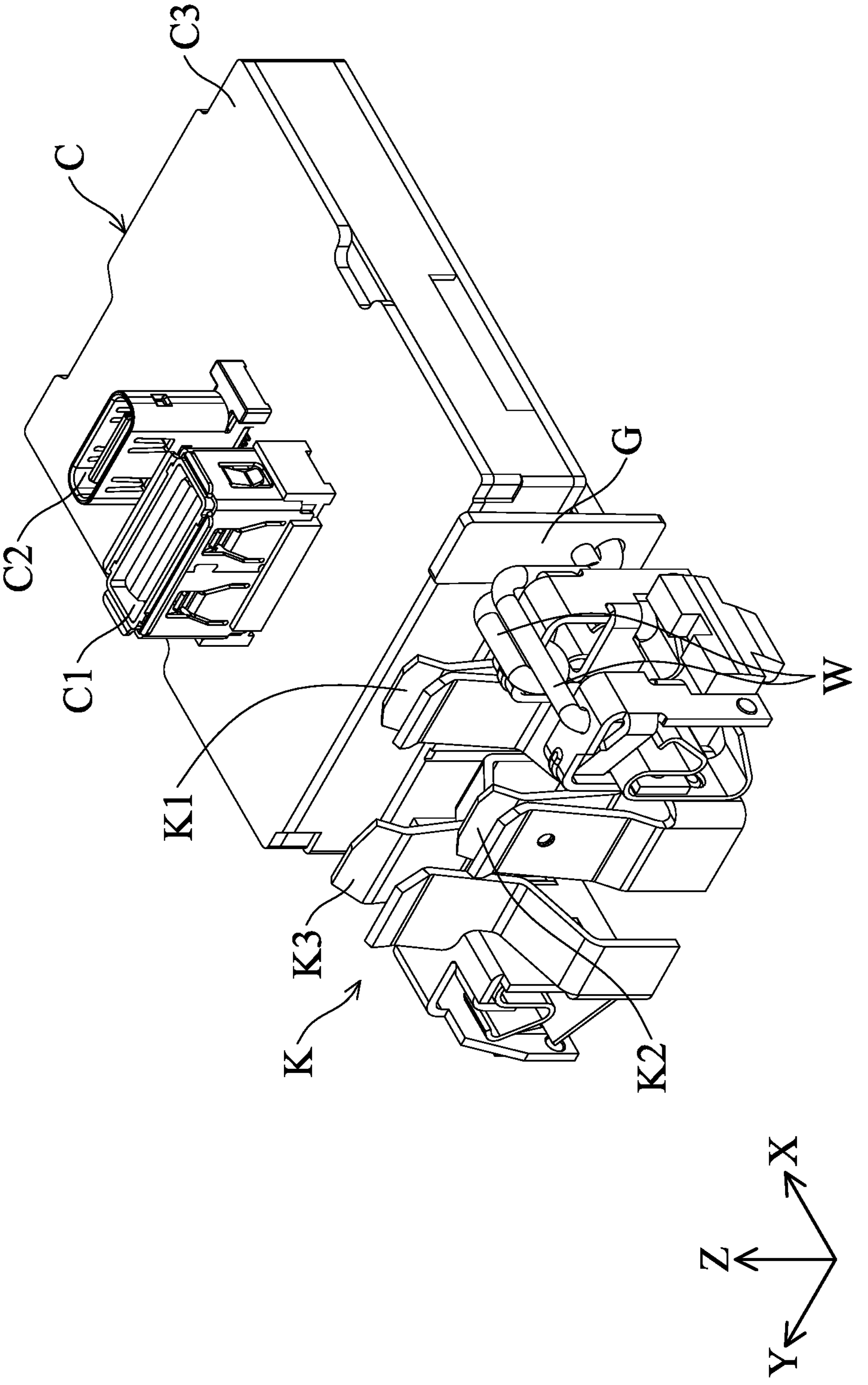
FIG. 6 is a perspective diagram of the socket unit K, the electrical connector unit C, the conductive wire W, and the gate plate G in FIG. 1.
Figure 7:
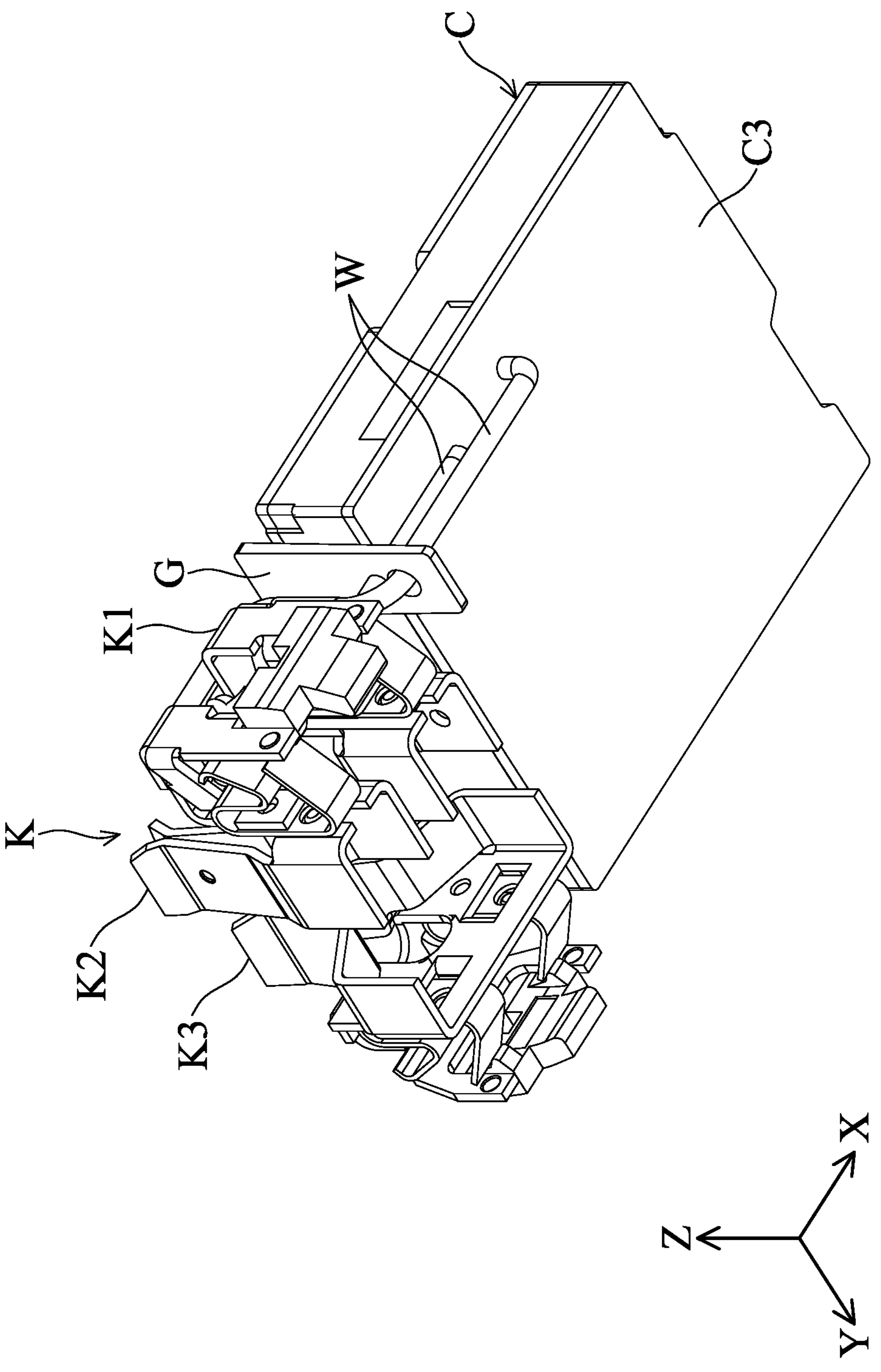
FIG. 7 is another perspective diagram of the socket unit K, the electrical connector unit C, the conductive wire W, and the gate plate G in FIG. 1.
Figure 8:
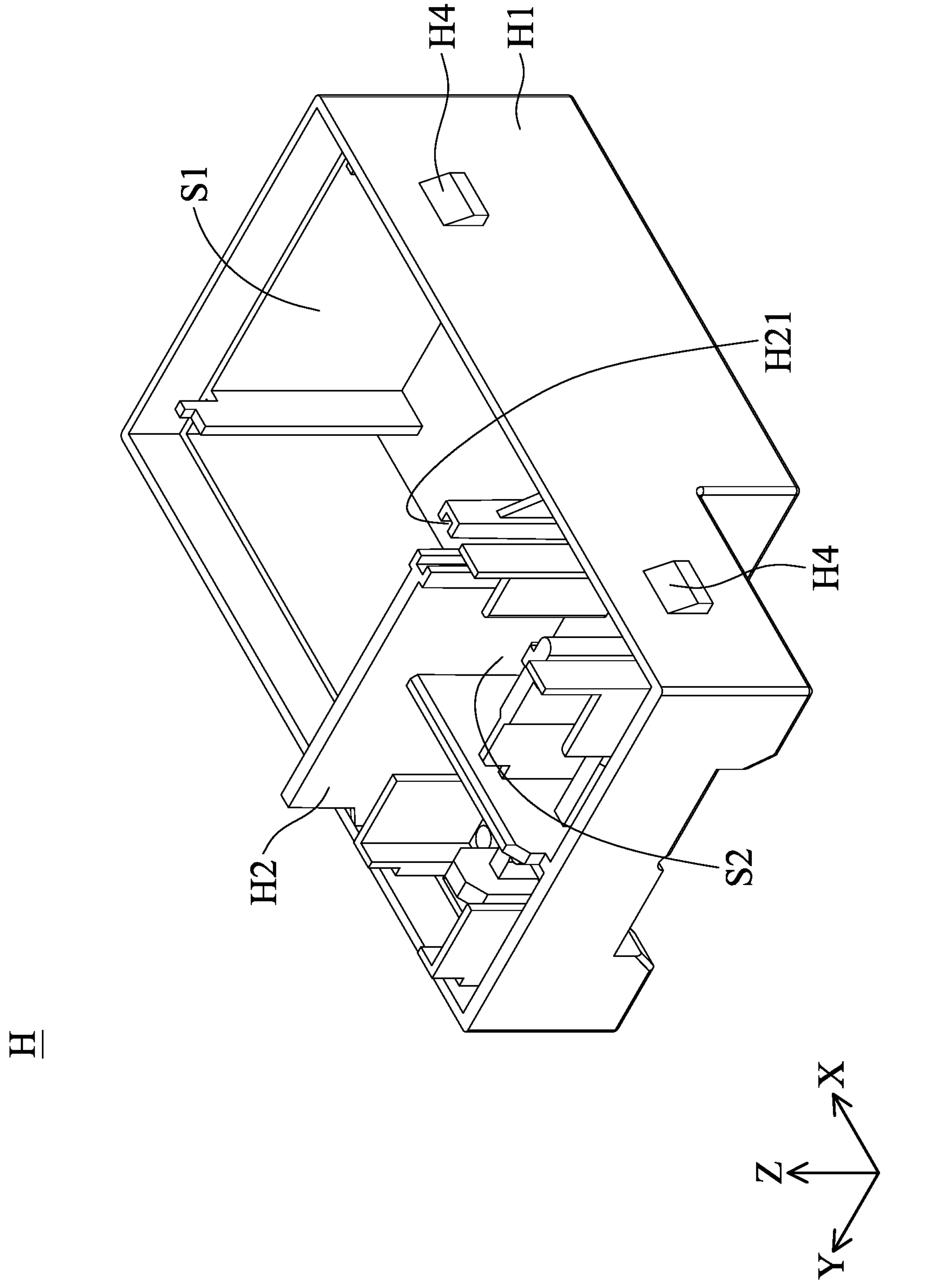
FIG. 8 is a perspective diagram of the housing H in FIG. 1.
Figure 9:
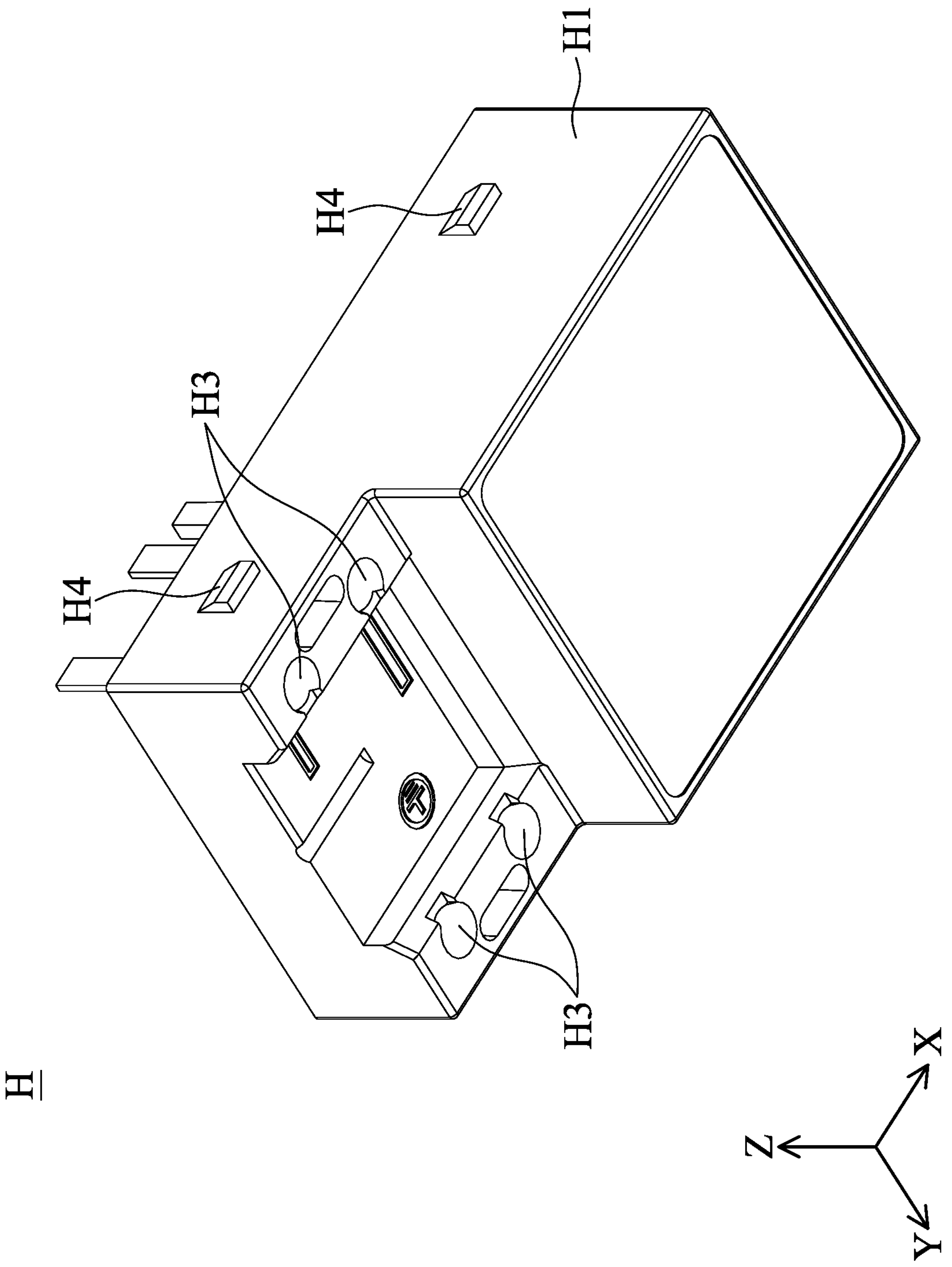
FIG. 9 is another perspective diagram of the housing H in FIG. 1.
Figure 10:
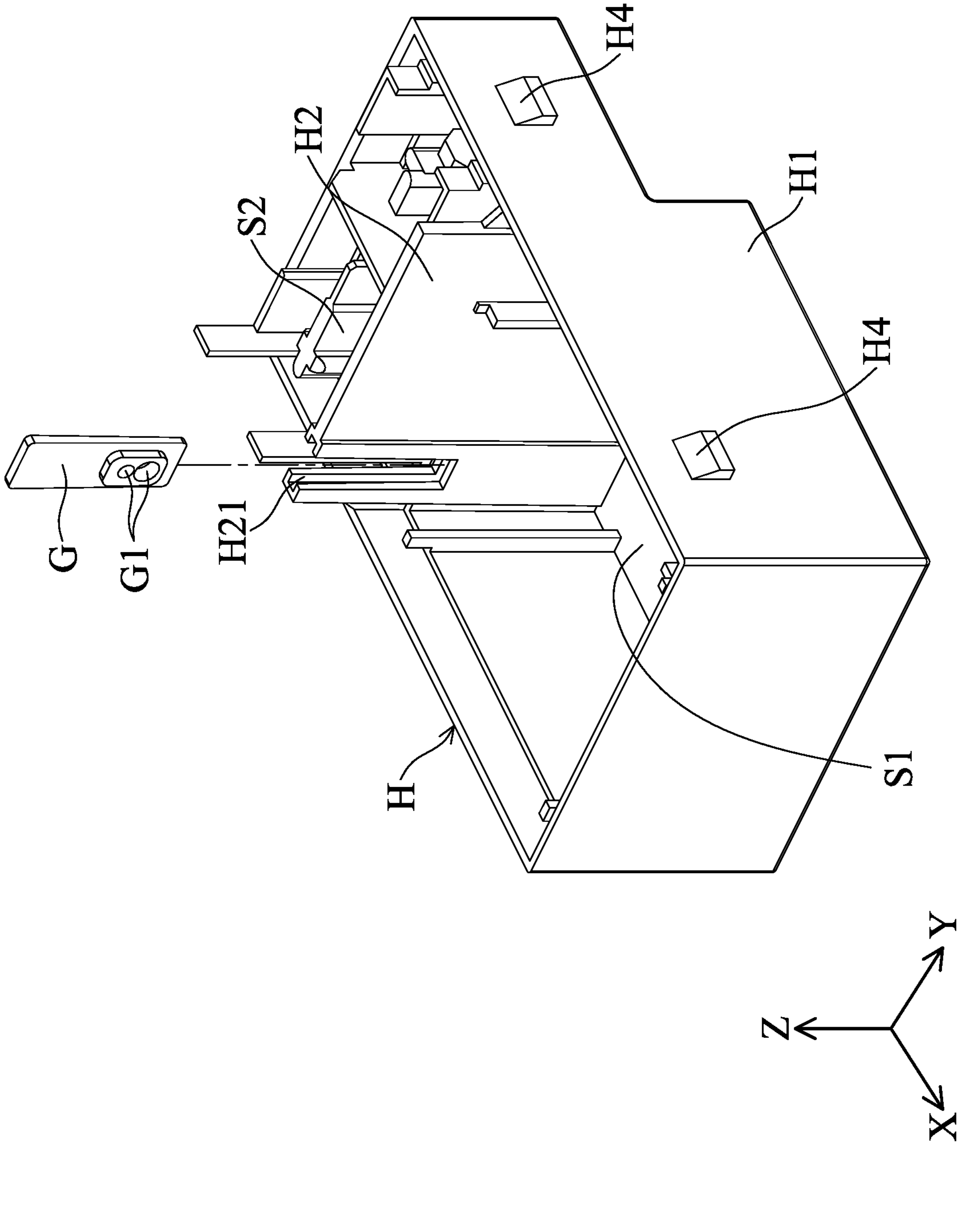
FIG. 10 is an exploded diagram of the gate plate G and the housing H before assembly.

FIG. 6 is a perspective diagram of the socket unit K, the electrical connector unit C, the conductive wire W, and the gate plate G in FIG. 1. FIG. 7 is another perspective diagram of the socket unit K, the electrical connector unit C, the conductive wire W, and the gate plate G in FIG. 1. FIG. 8 is a perspective diagram of the housing H in FIG. 1. FIG. 9 is another perspective diagram of the housing H in FIG. 1. FIG. 10 is an exploded diagram of the gate plate G and the housing H before assembly.

Referring to FIGS. 1 to 10, the housing H has a hollow main body H1 and a diaphragm H2 formed in the main body H1. Specifically, the main body H1 is divided into a first space S1 and a second space S2 by the diaphragm H2 for receiving the electrical connector unit C and the socket unit K, and the protrusions H4 are formed on the outer surface of the main body H1.

It should be noted that the diaphragm H2 has an opening H21. During assembly, the gate plate G is inserted in the opening H21 to prevent the glue in the first space S1 from leaking and flowing into the second space S2. Therefore, the hole H3 at the bottom of the housing H would not be blocked by the glue.

As shown in FIG. 10, at least a hole G1 is formed on the gate plate G, and the conductive wire W can be inserted through the hole G1 to electrically connect to the socket unit K and the electrical connector unit C.

Figure 11:
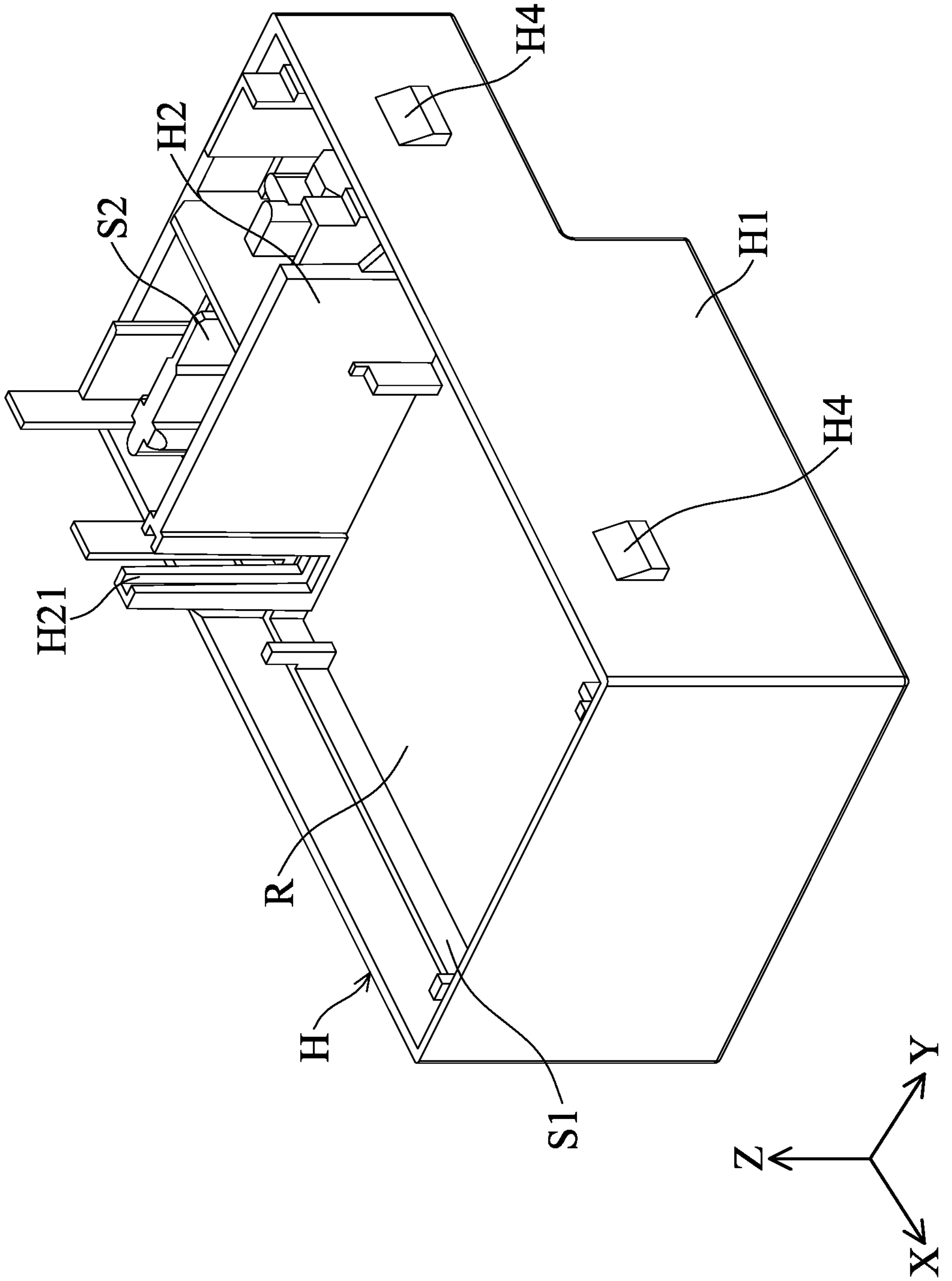
FIG. 11 is a perspective diagram showing the glue R is disposed in the first space S1 of the housing H.
Figure 12:
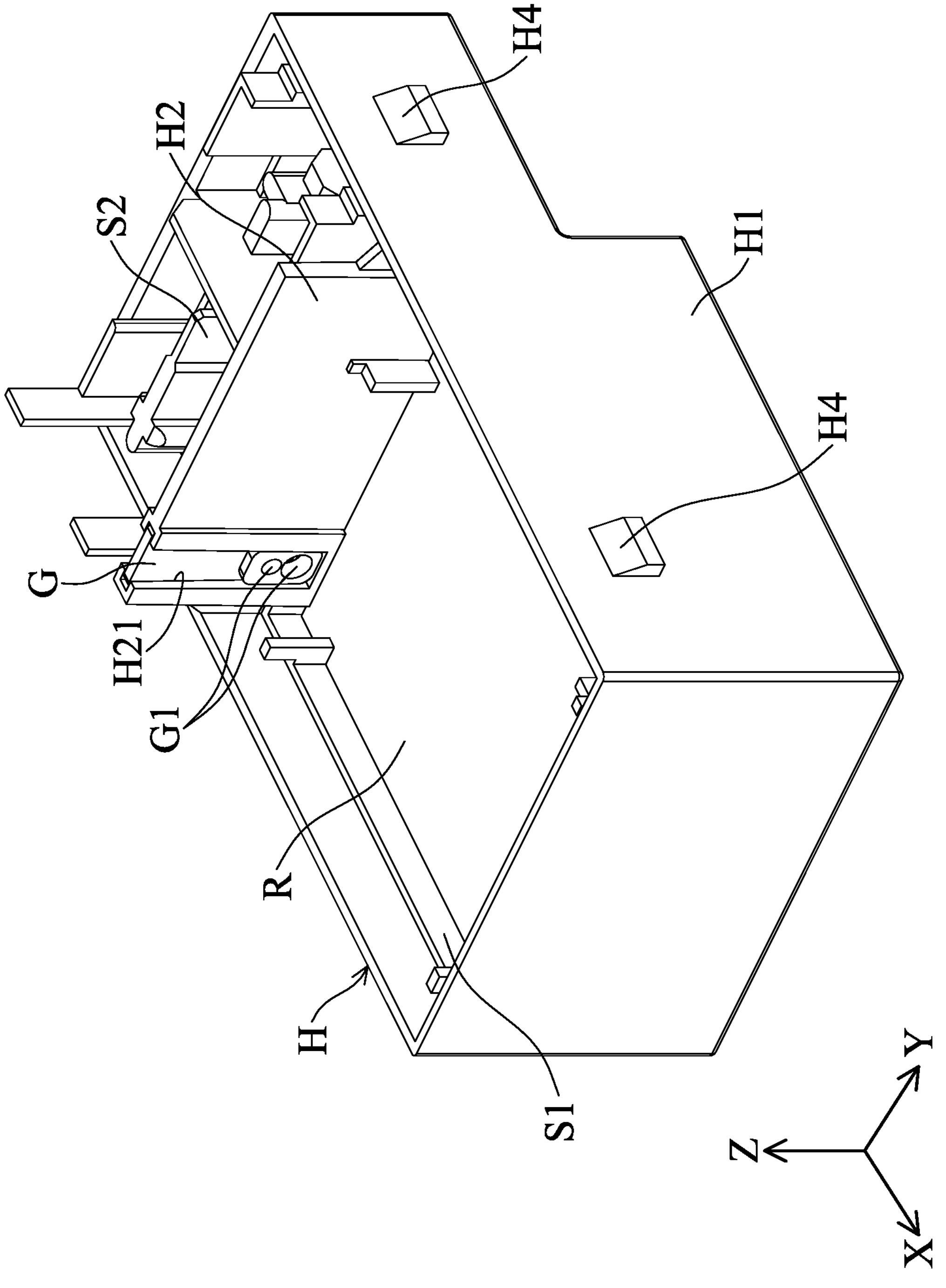
FIG. 12 is a perspective diagram showing the gate plate G is joined in the opening H21 to prevent the glue R in the first space S1 from flowing into the second space S2.
Figure 13:
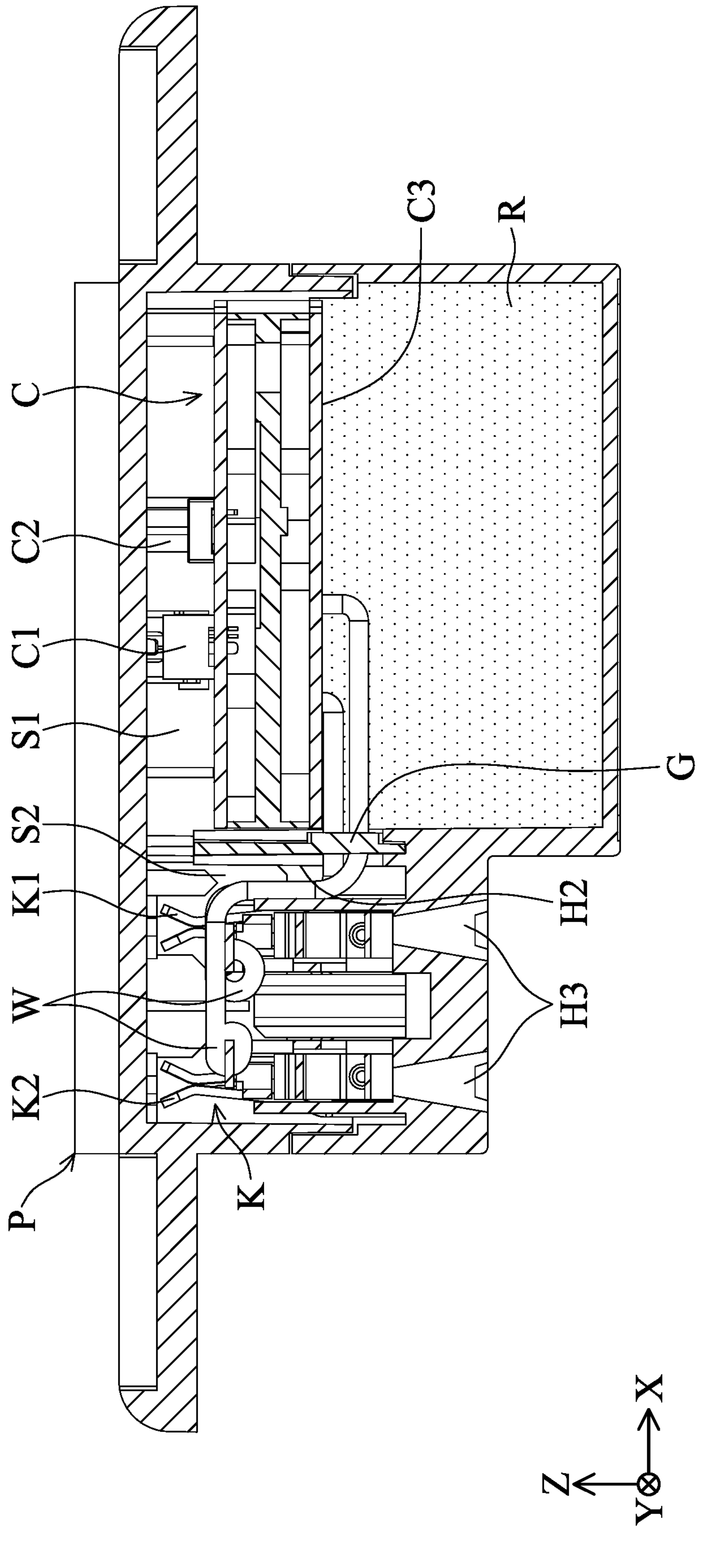
FIG. 13 is a cross-sectional view of the power connector module 100 after assembly.

FIG. 11 is a perspective diagram showing the glue R is disposed in the first space S1 of the housing H. FIG. 12 is a perspective diagram showing the gate plate G is joined in the opening H21 to prevent the glue R in the first space S1 from flowing into the second space S2. FIG. 13 is a cross-sectional view of the power connector module 100 after assembly.

As shown in FIG. 11, during assembly of the power connector module 100, the glue R can be applied into the first space S1 of the housing H. Here, the glue R may be thermal glue or insulating glue. When applying the glue R into the first space S1, the top surface of the glue R should be lower than the opening H21, whereby the glue R in the first space S1 can be prevented from leaking and flowing into the second space S2 through the opening H21.

Referring to FIG. 12, after the glue R is applied in the first space S1 of the housing H, the socket unit K, the electrical connector unit C, the conductive wires W, and the gate plate G can be put in the housing H together. It should be noted that the gate plate G is joined in the opening H21 of the diaphragm H2 to prevent the glue R in the first space S1 from flowing into the second space S2.

After the socket unit K, the electrical connector unit C, the conductive wires W, and the gate plate G are put in the housing H, as shown in FIG. 13, the glue R contacts the circuit module C3 at the bottom of the electrical connector unit C. Therefore, the electrical connector unit C can be firmly secured in the first space S1 of the housing H, and heat can be rapidly transferred from the electrical connector unit C to the outside of the power connector module 100 through the glue R.

While the electrical connector unit C is disposed in the first space S1 of the housing H, the glue R may be pushed by the electrical connector unit C and rise to a higher level. However, the glue R in the first space S1 can still be blocked by the gate plate G from flowing through the opening H21 of the diaphragm H2 to the second space S2.

Figure 14:
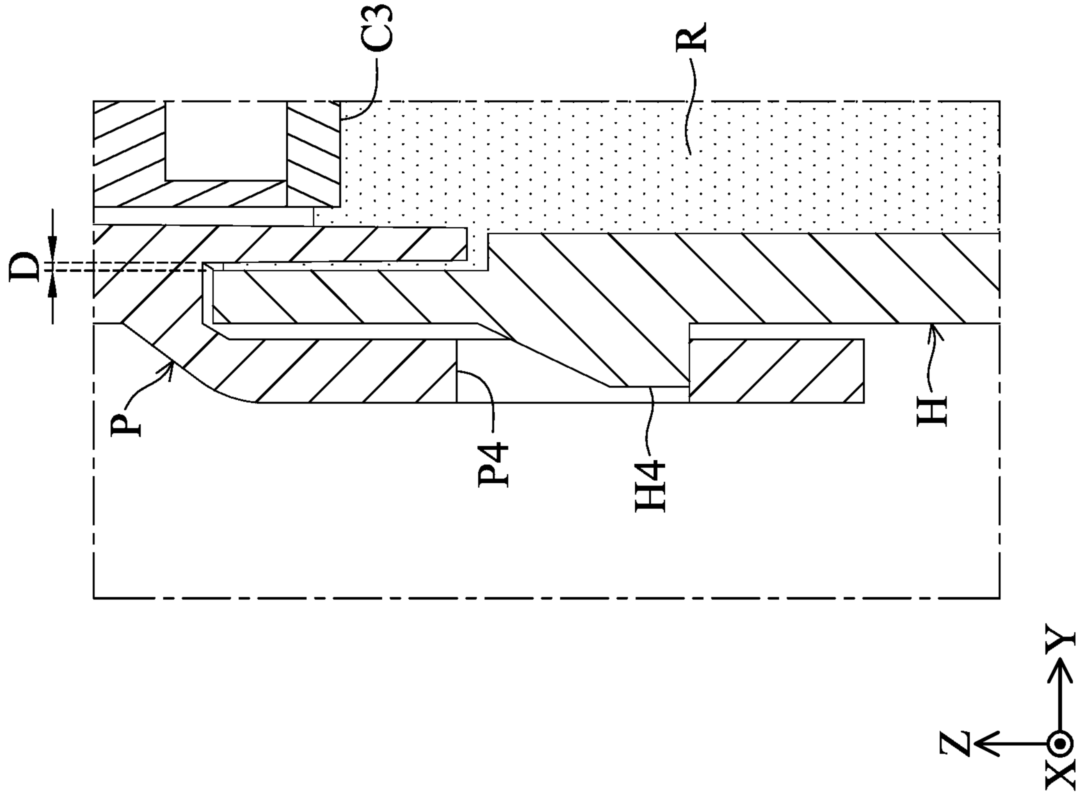
FIG. 14 is a partial enlarged cross-sectional view of the power connector module 100 after assembly.

FIG. 14 is a partial enlarged cross-sectional view of the power connector module 100 after assembly. As shown in FIG. 14, after assembly of the power connector module 100, the protrusions H4 on the outer surface of the housing H are joined in the slots P4 of the cover P, so that the cover P is affixed to the housing H. Here, a gap D is formed between the housing H and the cover P in the Y direction, and some of the glue R may flow into the gap D, thus increasing the adhesion area between the housing H and the cover P and enhancing the structural strength of the power connector module 100.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A power connector module, comprising:

a housing having a hollow main body and a diaphragm disposed in the main body, the diaphragm having an opening and dividing the main body into a first space and a second space;

an electrical connector unit disposed in the first space of the housing;

a socket unit disposed in the second space of the housing;

a glue disposed in the first space and contacting the electrical connector unit;

a gate plate disposed in the opening of the diaphragm to prevent the glue in the first space from flowing into the second space; and a conductive wire extending through the gate plate and electrically connecting the socket unit to the electrical connector unit.

2. The power connector module as claimed in claim 1, further comprising a cover joined to the housing.

3. The power connector module as claimed in claim 2, wherein the cover has a slot, and the housing further has a protrusion formed on an outer surface of the main body and joined to the slot.

4. The power connector module as claimed in claim 2, wherein a gap is formed between the cover and the housing, and some of the glue is received in the gap.

5. The power connector module as claimed in claim 1, wherein the electrical connector unit has a circuit module and a connector disposed on the circuit module, and the glue contacts the circuit module.

6. The power connector module as claimed in claim 5, wherein the connector comprises a USB connector.

7. The power connector module as claimed in claim 1, wherein the socket unit comprises an AC power socket.

8. The power connector module as claimed in claim 1, wherein the glue comprises thermal glue.

9. The power connector module as claimed in claim 1, wherein the gate plate has a hole, and the conductive wire extends through the hole to electrically connect to the socket unit and the electrical connector unit.

10. The power connector module as claimed in claim 1, wherein the electrical connector unit has a circuit module and a plurality of connectors disposed on the circuit module, and the socket unit and the connectors are arranged along a long axis of the power connector module.

* * * * *